Figure 1:
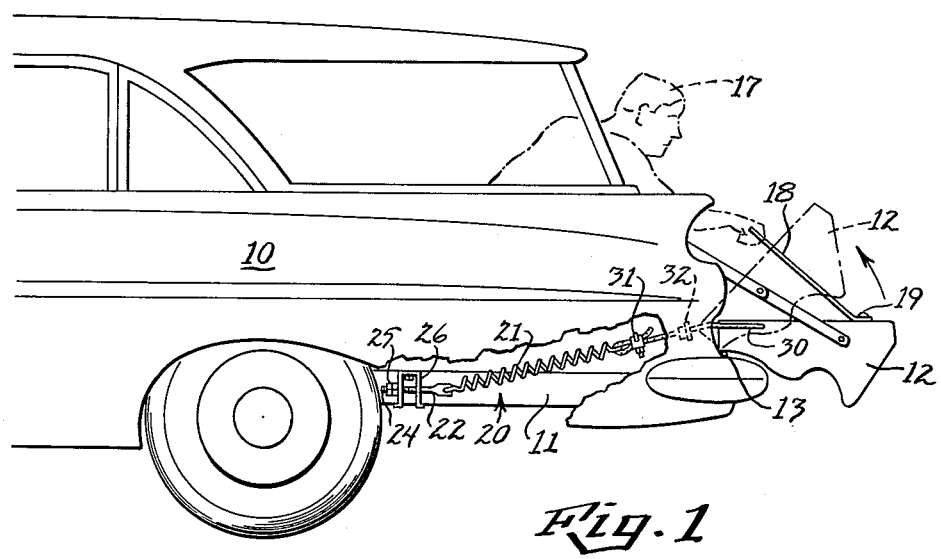

Nov. 21, 1961   R. H. BROWN   3,009,732
ADJUSTABLE COUNTERBALANCE FOR TAIL GATE
Filed Oct. 26, 1959

INVENTOR:
ROBERT H. BROWN
BY
Harrington A. Lackey
ATTORNEY

United States Patent Office 3,009,732
Patented Nov. 21, 1961

3,009,732
ADJUSTABLE COUNTERBALANCE FOR
TAIL GATE
Robert H. Brown, R.F.D. 4, Pulaski, Tenn.
Filed Oct. 26, 1959, Ser. No. 848,648
1 Claim. (Cl. 296—57)

This invention relates to a counterbalance for the tail gate of a vehicle, and more particularly to an adjustable counterbalance particularly adapted for the tail gate of a station wagon of the type having a rear seat facing toward the rear of the station wagon in order to provide easier manipulation of the tail gate from the interior of the station wagon.

Heretofore, a counterbalance in the tail gate of a station wagon has not been particulalarly necessary because the tail gate has been manipulated from the outside in much the same fashion as the tail gate of a truck or wagon. The conventional model of station wagon either employs seats facing toward the front, in which event the tail gate is not used, since the passengers enter through the side doors, or no seats in the rear of the station wagon, in which case the tail gate is manipulated from the outside for loading materials into the rear of the station wagon for hauling.

However, in the newer model station wagon, such as the 1959 Chevrolet "Kingswood," a rear seat has been incorporated facing the rear in order to permit passengers, such as children, to observe through the rear window of the station wagon. Since access to this rear seat is provided for only by means of the tail gate, the tail gate must ordinarily be closed by an occupant of the rear seat from the inside. Such manipulation requires that the occupant lean out from the rear of the vehicle, grasp the outer end of the heavy tail gate and lift upward and inward until the tail gate closes to form the rear wall of the vehicle. Since the "Kingswood" model station wagon is not provided with a counterbalance, the task of the occupant of the rear seat of the vehicle is indeed arduous not only because he has to overcome the weight of the tail gate, but also because he is in a cramped and disadvantageous position for obtaining proper leverage in manipulating the tail gate.

It is therefore an object of this invention to overcome the disadvantages enumerated by providing a counterbalance of simple construction which is adjustable and which may be easily installed in the current models of station wagons having seats facing toward the rear without changing the construction of either the tail gate or the body of the vehicle.

Another object of this invention is to provide a counterbalance for a tail gate which is locked against action when the tail gate is in its extreme open position, but which may be easily rendered operative by the slight upward movement of the tail gate.

Another object of this invention is to provide a counterbalance for the tail gate of a station wagon, which may be installed in the original assembly of the station wagon or which may be easily installed as an accessory without detracting from the overall appearance of the vehicle, most of the parts being hidden from view.

A further object of this invention is to provide a counterbalance for the tail gate of a station wagon in which the strength of the coil spring incorporated in the counterbalance may be easily adjusted.

Figure 2:
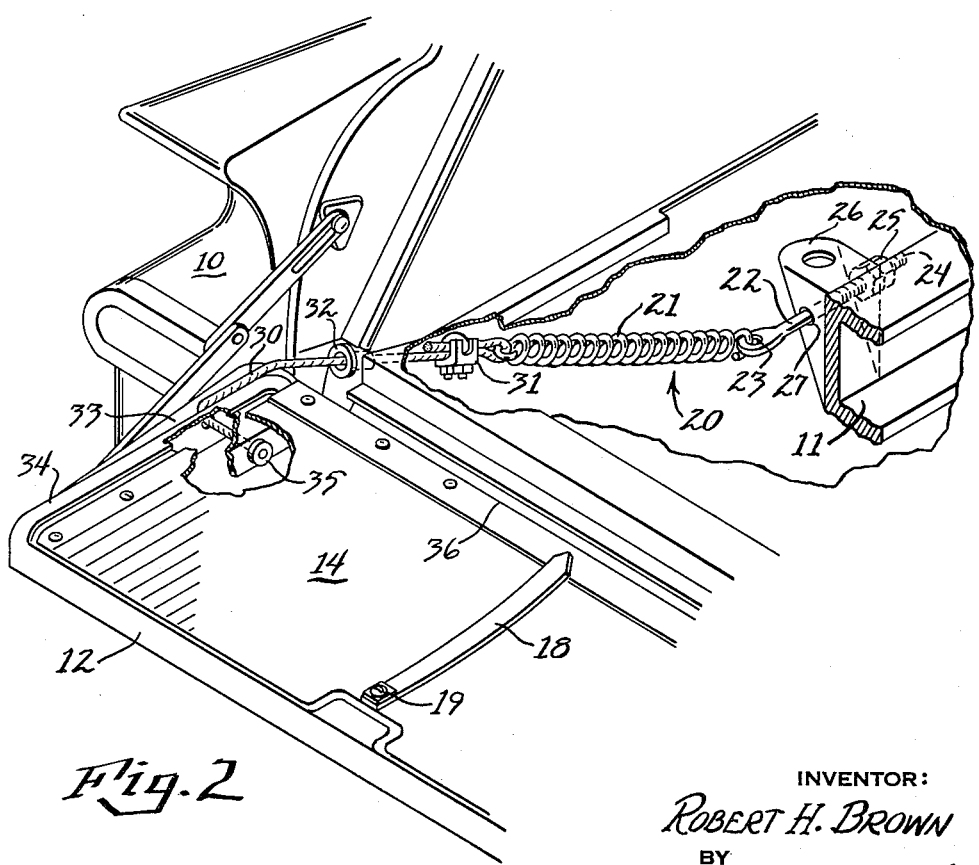

Further objects and advantages of this invention will be apparent from the following description taken in conjunction with the drawings, wherein:

FIG. 1 is a side elevation of the rear end of a station wagon having a seat facing toward the rear, with parts broken away to disclose the operation of the invention; and FIG. 2 is a perspective view of the rear end of the station wagon with parts broken away to disclose the elements of the invention.

Referring now to the drawings in more detail, the body 10 of a 1959 Chevrolet "Kingswood" station wagon is disclosed having a rear seat (not shown) facing toward the rear. FIGS. 1 and 2 disclose a portion of a chassis frame 11, and a tail gate 12 supported on the rear end of the body 10 by the hinges 13 located above the chassis frame 11. FIG. 1 discloses the tail gate 12 in solid lines in its extreme open position, in which the inside panel 14 of the tail gate is substantially horizontal. The tail gate 12 is designed to be swung or pivoted upward and inward to its closed position to form the rear wall of the body 10. FIG. 1 discloses an intermediate pivoted position of the tail gate 12 in dashed lines.

In order to permit an occupant 17 of the rear seat to close the tail gate 12, a handle, such as the strap 18, is secured to the inside panel 14 by means, such as a screw 19, adjacent the outer end of the tail gate 12.

In order to overcome the weight and the disadvantageous leverage position of the tail gate 12 for the benefit of the occupant 17, a counterbalance 20 of novel and simple design is provided which may be easily installed, either as an original part of the vehicle or as an accessory, with a minimum number of parts exposed to view. The counterbalance 20 comprises an elongated coil spring 21, normally in tension. Connected to the forward end of the coil spring 21 is a rod 22. The rod 22 may have an aperture 23 through which the forward end of the spring may be hooked. The forward or free end 24 of the rod 22 is threaded over a substantial length thereof and adapted to receive a threaded nut 25. A bracket 26 is fixed to a portion of the chassis frame 11. The bracket 26 is provided with one or more apertures 27 through which the rod 22 may be slidably received. By inserting the threaded end of the rod 24 through the apertures 27, the forward end of the coil spring 21 may be longitudinally adjusted by means of rotating the nut 25 on the threaded end of the rod and against the bracket 26. In this manner the tension of the spring 21 may be varied.

One end of a cable 30 is secured to the rear end of the coil spring 21 by means of a cable clamp 31. The cable 30 passes through a ferrule 32 lining an opening in the rear of the body 10 and extends over a ledge 33 adjacent the side edge of the tail gate 12 and passes through the side frame bar 34 of the tail gate where the free end of the cable 30 is held by an enlarged cap 35. The cable 30 is attached to the side bar 34 at a point spaced from the hinged edge 36 of the tail gate in order to effect leverage about the hinges 13. The only portion of the counterbalance 20 which is exposed to view is that portion of the cable 30 between the ferrule 32 and the point at which it enters the side frame bar 34.

It has been found that the point of attachment of the cable 30 to the side frame bar 34 does not have to be spaced too far from the hinged edge 36. For example, in a tail gate which is twenty-one inches wide, the cable has been successfully attached at a point three and three-quarters inches from the hinged edge 36.

By locating the bracket 26 as far forward as possible, the leverage effected by the counterbalance 20 on the tail gate 12 is improved. Thus the desired leverage may be obtained by either properly locating the bracket 26 or adjusting the tension of the spring 21, so that the occupant 17 will be immediately assisted in closing the tail gate 12 when he pulls inward on the strap 18.

It will be apparent to those skilled in the art that various changes may be made in the invention without departing from the spirit and scope thereof, and therefore the invention is not limited by that which is shown in the drawings and described in the specification, but only as indicated in the appended claim.

What is claimed is:

In a station wagon having a tail gate and a hinge for pivoting said tail gate to the rear end thereof for vertical pivotal movement between an open substantially horizontal platform position to a closed position forming the rear wall of the station wagon, said station wagon having a chassis frame located below said hinge, said tail gate having a side ledge adjacent the forward edge thereof and spaced above said hinge in open position, a cable guide fixed in the chassis of said station wagon slightly below and in front of said ledge, a counterbalance for said tail gate, comprising an elongated spring normally in tension, means for attaching the forward end of said spring to said chassis frame forward of said cable guide, a cable, one end of said cable being attached to the rear end of said spring and the other end of said cable being attached to said tail gate at a point spaced rearward of the forward edge of said ledge, said cable extending axially of said spring through said cable guide and being bent by the forward edge of said ledge to extend substantially horizontally along said ledge when said tail gate is in open position, and the portion of said cable between said guide and its attachment to said tail gate extending in an upward direction from the axis of said coil spring when said tail gate is in closed position.

References Cited in the file of this patent

UNITED STATES PATENTS

| | | |
|---|---|---|
| 1,963,388 | Smith | June 19, 1934 |
| 2,651,542 | Meyer | Sept. 8, 1953 |
| 2,796,287 | Moyes | June 18, 1957 |